(12) United States Patent
Wu et al.

(10) Patent No.: US 11,867,062 B2
(45) Date of Patent: Jan. 9, 2024

(54) CONSTRUCTION METHOD FOR DEFORMABLE ANCHOR CABLE CAPABLE OF BEING PRESTRESSED

(71) Applicant: Fuzhou University, Fuzhou (CN)

(72) Inventors: Xuezhen Wu, Fuzhou (CN); Yujing Jiang, Nagasaki (JP); Tao Deng, Fuzhou (CN); Gang Wang, Qingdao (CN); Zhenchang Guan, Fuzhou (CN); Qing Ye, Fuzhou (CN)

(73) Assignee: Fuzhou University, Fuzhou (CN)

( * ) Notice: Subject to any disclaimer, the term of this patent is extended or adjusted under 35 U.S.C. 154(b) by 2 days.

(21) Appl. No.: 17/835,037

(22) Filed: Jun. 8, 2022

(65) Prior Publication Data
US 2022/0397037 A1    Dec. 15, 2022

(30) Foreign Application Priority Data

Jun. 10, 2021    (CN) .......................... 202110646330.8

(51) Int. Cl.
*E21D 21/00* (2006.01)
(52) U.S. Cl.
CPC ......... *E21D 21/006* (2016.01); *E21D 21/008* (2013.01); *E21D 21/0033* (2013.01)
(58) Field of Classification Search
CPC . E21D 21/006; E21D 21/0033; E21D 21/008; E21D 21/0026
See application file for complete search history.

(56) References Cited

U.S. PATENT DOCUMENTS

| 5,288,176 A * | 2/1994 | Huff ..................... E21D 21/0026 |
| | | 405/302.2 |
| 2007/0031196 A1* | 2/2007 | Bruneau ............... E21D 21/004 |
| | | 405/262 |
| 2020/0340359 A1* | 10/2020 | Holden ................. E21D 21/006 |

FOREIGN PATENT DOCUMENTS

| CA | 2176351 A1 | 5/1995 |
| CN | 102094662 A | 6/2011 |
| CN | 102434179 A | 5/2012 |
| CN | 102678147 A | 9/2012 |
| CN | 202866845 U | 4/2013 |
| CN | 110295936 A | 10/2019 |

OTHER PUBLICATIONS

CN2021106463308 first office action.

* cited by examiner

*Primary Examiner* — Janine M Kreck
(74) *Attorney, Agent, or Firm* — IPro, PLLC

(57) ABSTRACT

The present disclosure relates to a construction method for a deformable anchor cable capable of being prestressed. The anchor cable includes an outer sleeve, a shrinkage pipe, an inner sleeve, a steel strand, an anchor and a tray. When the anchor cable is in use, a hole is drilled first, then the anchor cable is mounted in the drilled hole, and finally a prestress is applied to the steel strand of the anchor cable. According to the construction method, the construction is convenient; the anchor cable has the characteristics of high strength and large deformation, and can be easily prestressed; and the large deformation is realized by squeezing the inner sleeve by means of the anchor, which completely overcomes the problem of breaking a cold-drawn rod during the large deformation process.

7 Claims, 4 Drawing Sheets

CONSTRUCTION METHOD FOR DEFORMABLE ANCHOR CABLE CAPABLE OF BEING PRESTRESSED

CROSS REFERENCE TO RELATED APPLICATION

The present disclosure claims the benefit of priority to Chinese patent application No. 202110646330.8, filed on Jun. 10, 2021 to China National Intellectual Property Administration and titled "Construction method for deformable anchor cable capable of being prestressed", which is incorporated herein by reference in its entirety.

FIELD

The present disclosure belongs to a geotechnical engineering supporting device, and relates to a construction method for a deformable anchor cable capable of being prestressed.

BACKGROUND

An anchor cable is a commonly used supporting device in mines, tunnels, and water conservancy and hydropower projects. Under complex geological conditions, when the deformation of surrounding rock exceeds the range that the anchor cable can bear, the anchor cable will be damaged, resulting in instability and failure of underground engineering. Therefore, when the surrounding rock is largely deformed, the anchor cable needs to have the characteristics of large deformation to avoid self-destruction.

An existing large deformation anchor cable has the problems of insufficient bearing force, complex structure, high cost, and incapability of being prestressed. According to the patent CN102678147B proposed by the inventor of the present patent, the large deformation of an anchor cable is realized by the principle of cold drawing of a steel bar, but a cold-drawn rod is easily broken at the exit position during the drawing process, and a prestress cannot be applied by tensioning a steel strand, and the scope of application is limited.

SUMMARY

Provided in the present disclosure is a construction method for a deformable anchor cable capable of being prestressed.

The solution used in the present disclosure to solve the technical problem is a construction method for a deformable anchor cable capable of being prestressed. The anchor cable includes an outer sleeve, a shrinkage pipe, an inner sleeve, a steel strand, an anchor and a tray;
construction includes the following steps:
step 1, drilling an anchor hole in a rock mass to be supported, withdrawing a drill pipe after the drill pipe reaches the bottom, and then using a big diameter bit to ream and enlarge a hole mouth section, wherein the diameter of the anchor hole is greater than the diameter of the steel strand, and the diameter of the enlarged hole mouth section is matched with the diameter of the outer sleeve;
step 2, rotatably pushing the steel strand into the anchor hole, and fixing an inner end of the steel strand in the anchor hole by means of an anchoring agent;
step 3, fixing the shrinkage pipe to an inner end of the outer sleeve close to the depths of the drilled hole, then mounting a rubber plug on the inner end of the outer sleeve close to the depths of the drilled hole, then placing the outer sleeve into the enlarged section of the anchor hole and enabling the steel strand to pass through the outer sleeve;
step 4, enabling the inner sleeve to sleeve the steel strand, inserting the inner sleeve into the outer sleeve and enabling an inner end of the inner sleeve to make contact with a shrinkage end;
step 5, enabling an outer end of the steel strand to penetrate out of the anchor, and enabling the anchor to be sleeved by the outer sleeve and abut against an outer end of the inner sleeve;
step 6, enabling the tray to sleeve an exposed part of the outer sleeve, enabling an inner end of the tray to abut against the rock mass and an outer end of the tray to abut against a nut that is in threaded fit with an outer end of the outer sleeve, and tightening the nut to lock the tray; and
step 7, tensioning the steel strand by a tensioning apparatus to apply a prestress so as to meet design requirements, and applying a sufficient prestress to cause the inner sleeve to be squeezed out of the shrinkage pipe by a distance, thus completely blocking the shrinkage end and preventing moisture in the rock mass from entering the outer sleeve to cause corrosion.

Further, the strength of the inner sleeve is less than the strength of the shrinkage pipe; the shrinkage pipe includes a necked section and an equal-diameter section that are sequentially connected from outside to inside; the outer diameter of the necked section remains unchanged, the inner diameter of the necked section gradually shrinks, and the outer diameter and inner diameter of the equal-diameter section remain unchanged.

Further, the outer diameter of the inner sleeve is matched with the inner diameter of the outer sleeve, the anchor is in contact with the outer end of the inner sleeve, a necked lead angle section is arranged on the periphery of the inner end of the inner sleeve, and after the anchor cable is stressed, the anchor squeezes the inner sleeve.

Further, the rubber plug includes a thin section and a thick section that are sequentially connected, a small hole is provided in the middle of the rubber plug for the steel strand to pass through, the thin section is inserted into an inner hole of the shrinkage pipe or an inner hole of the outer sleeve, and the outer diameter of the thick section is equal to the outer diameter of the outer sleeve.

Further, by reducing the thickness of the thick section of the rubber plug, the contact stiffness between the bottom end of the outer sleeve and the rock mass at the bottom end of the enlarged part of the anchor hole can be improved, thereby increasing a contact force F1 between the bottom end of the outer sleeve and the rock mass at the bottom end of the enlarged part of the anchor hole, and further reducing a tensile force F2 borne by the nut and the tray, and preventing the nut from being damaged, wherein the sum of F1 and F2 is the total bearing force of the anchor cable, and is also equal to the tensile force borne by the anchoring agent; and by increasing the thickness of the thick section of the rubber plug, the contact stiffness between the bottom end of the outer sleeve and the rock mass at the bottom end of the enlarged part of the anchor hole can be reduced, thereby reducing the contact force between the bottom end of the outer sleeve and the rock mass at the bottom end of the enlarged part of the anchor hole, preventing the rock mass at the bottom end of the enlarged part of the anchor hole from being damaged, and making the nut fully play its own role.

Further, before tightening the nut in step 6, a certain prestress is applied, and this part of prestress directly acts on the rock mass at the bottom end of the enlarged part of the anchor hole, thereby increasing the bearing ratio of the contact force F1 between the bottom end of the outer sleeve and the rock mass at the bottom end of the enlarged part of the anchor hole.

Further, a strain or stress sensor is embedded in the thick section of the rubber plug, and the sensor measures the force F1 borne by the rock mass at the bottom end of the enlarged part of the anchor hole, and then the subsequent thickness of the thick section of the rubber plug of the anchor cable is adjusted, so that the magnitude of F1 is between 20% and 50% of the ultimate bearing force of the anchor cable.

Further, the outer sleeve is a thick-walled steel pipe, the shrinkage pipe is a high-strength steel pipe, and the inner sleeve is a steel pipe.

Compared with the prior art, the present disclosure has the following beneficial effects: the construction is convenient; the anchor cable has the characteristics of high strength and large deformation, and can be easily prestressed; and the large deformation can be realized by squeezing the inner sleeve by means of the anchor, which completely overcomes the problem of breaking a cold-drawn rod during the large deformation process.

BRIEF DESCRIPTION OF THE DRAWINGS

The present patent for disclosure will be further described below in conjunction with the accompanying drawings.

In the figures: 1—Outer sleeve, 2—Shrinkage pipe, 3—Inner sleeve, 4—Steel strand, 5—Anchor, 6—Tray, 7—Nut, 8—Anchoring agent, 9—Rubber plug, A—Thin section of anchor hole, B—Reamed section of anchor hole.

DETAILED DESCRIPTION OF THE EMBODIMENTS

The present disclosure will be further described below in conjunction with accompanying drawings and specific embodiments.

Figure 1:
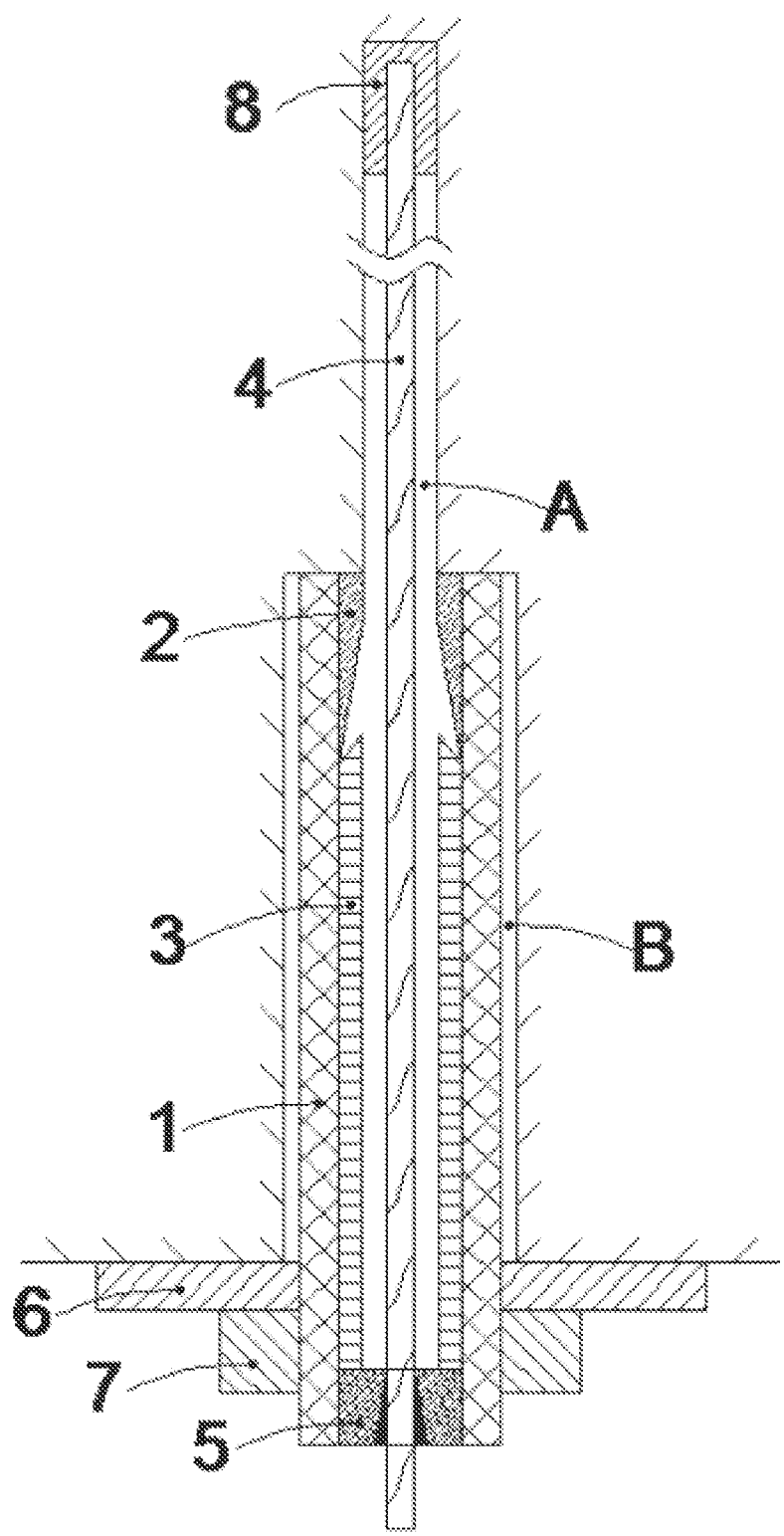
FIG. 1 is a schematic diagram of the structural principle of this anchor cable.
Figure 2:
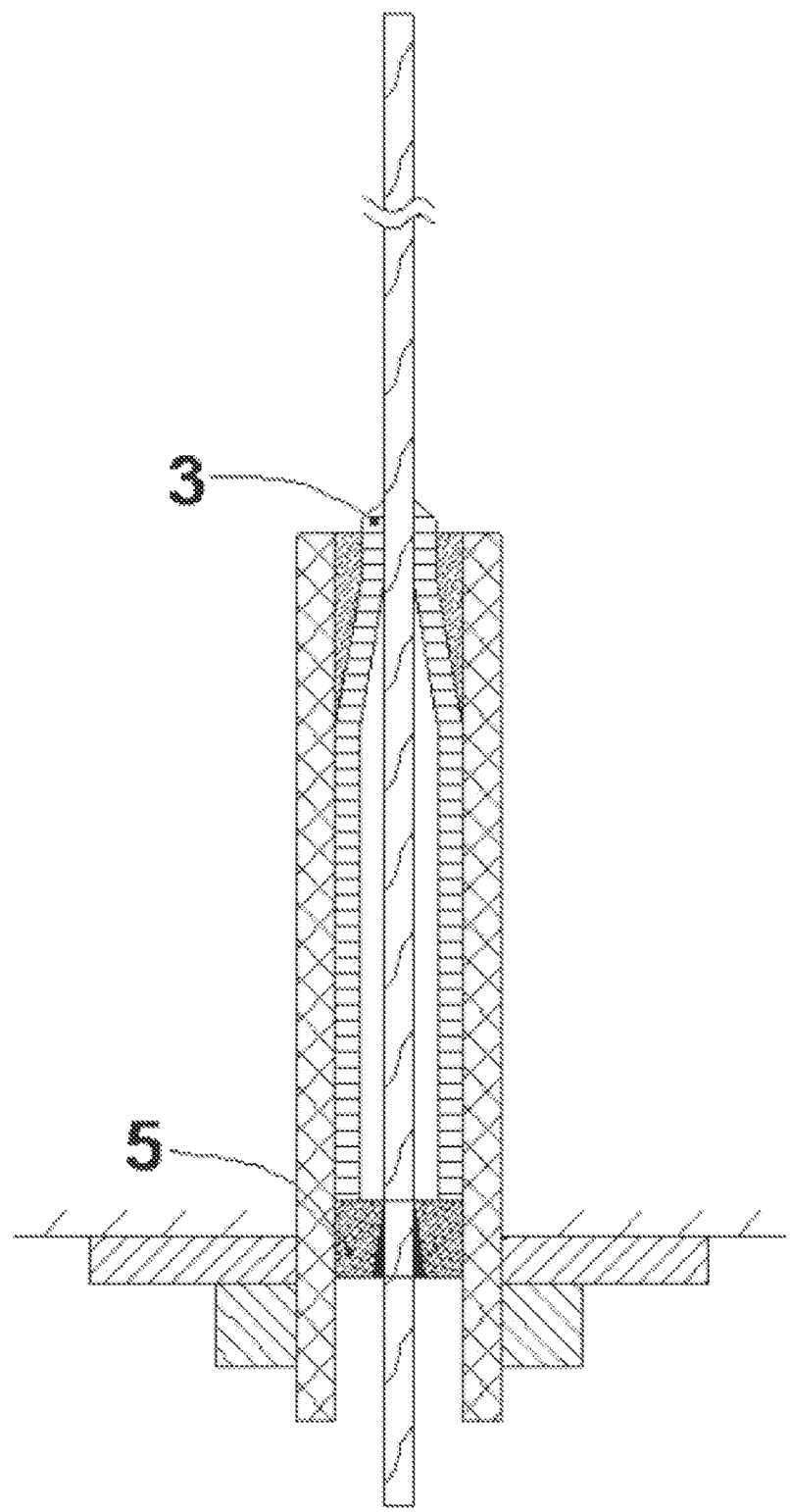
FIG. 2 is a schematic diagram of this anchor cable after a prestress is applied to enable an inner sleeve to close a shrinkage end.
Figure 3:
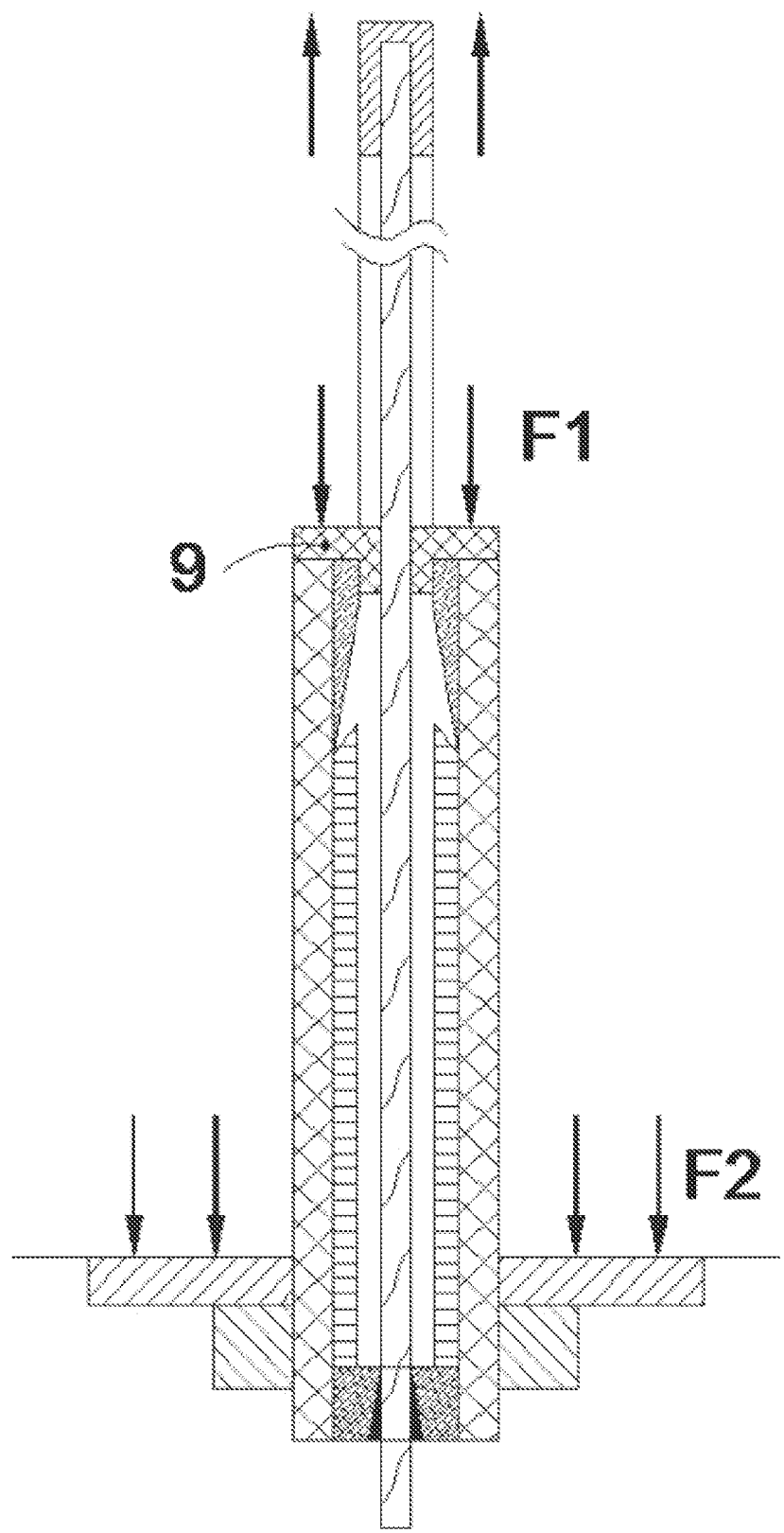
FIG. 3 is a schematic diagram of a mounting structure of a rubber plug.
Figure 4:
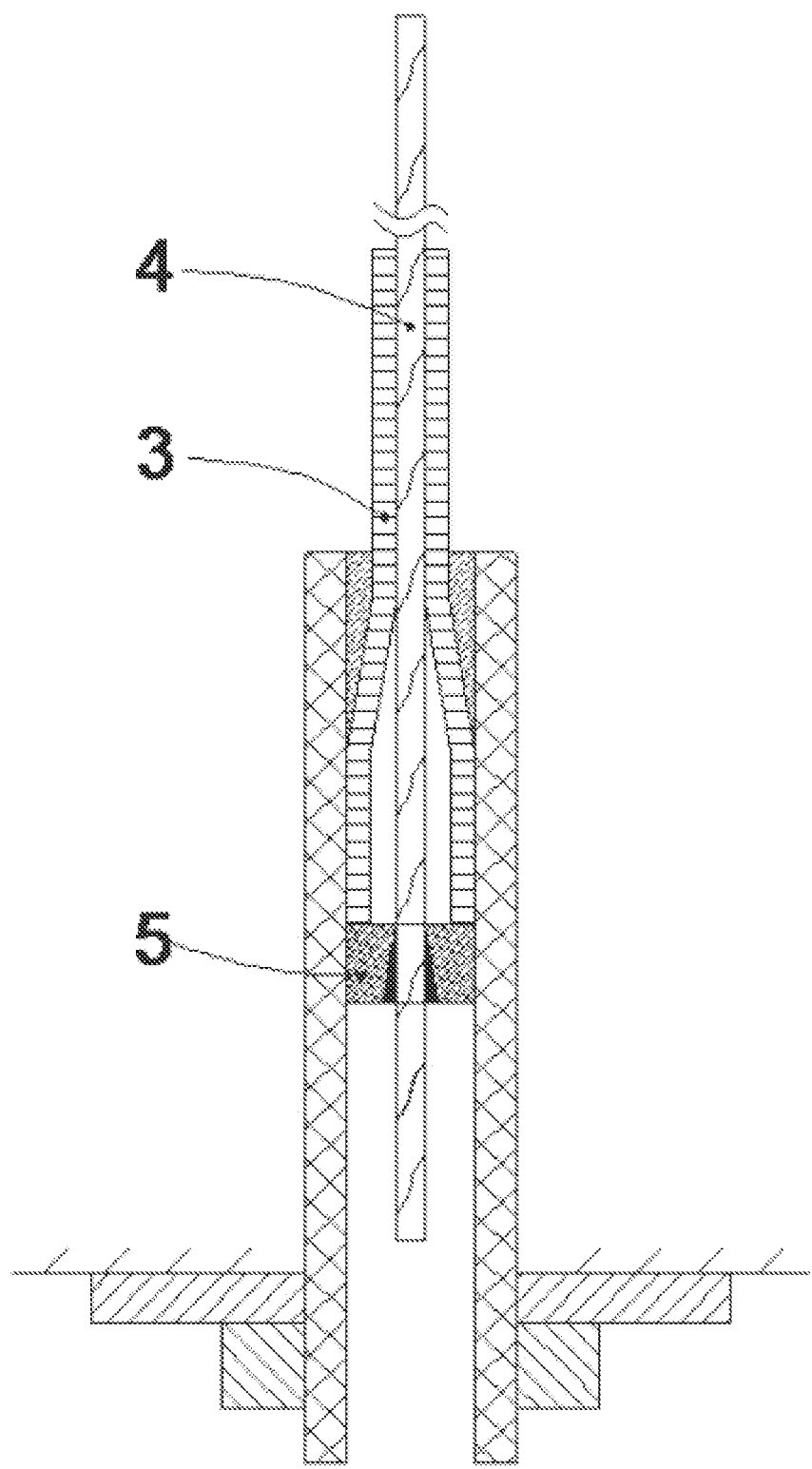
FIG. 4 is a schematic diagram of this anchor cable being largely deformed after large deformation of surrounding rock.

As shown in FIGS. 1-4, provided is a construction method for a deformable anchor cable capable of being prestressed. The anchor cable includes an outer sleeve 1, a shrinkage pipe 2, an inner sleeve 3, a steel strand 4, an anchor 5 and a tray 6;

construction includes the following steps:

step 1, drilling an anchor hole in a rock mass to be supported, withdrawing a drill pipe after the drill pipe reaches the bottom, and then using a big diameter bit to ream and enlarge a hole mouth section, wherein the diameter of the anchor hole is greater than the diameter of the steel strand, and the diameter of the enlarged hole mouth section is matched with the diameter of the outer sleeve;

step 2, rotatably pushing the steel strand into the anchor hole, and fixing an inner end of the steel strand in the anchor hole by means of an anchoring agent 8;

step 3, fixing the shrinkage pipe to an inner end of the outer sleeve close to the depths of the drilled hole, then mounting a rubber plug 9 on the inner end of the outer sleeve close to the depths of the drilled hole, then placing the outer sleeve into the enlarged section of the anchor hole and enabling the steel strand to pass through the outer sleeve;

step 4, enabling the inner sleeve to sleeve the steel strand, inserting the inner sleeve into the outer sleeve and enabling an inner end of the inner sleeve to make contact with a shrinkage end;

step 5, enabling an outer end of the steel strand to penetrate out of the anchor, and enabling the anchor to be sleeved by the outer sleeve and abut against an outer end of the inner sleeve;

step 6, enabling the tray to sleeve an exposed part of the outer sleeve, enabling an inner end of the tray to abut against the rock mass and an outer end to abut against a nut 7 that is in threaded fit with an outer end of the outer sleeve, and tightening the nut to lock the tray; and step 7, tensioning the steel strand by a tensioning apparatus to apply a prestress so as to meet design requirements, and applying a sufficient prestress to cause the inner sleeve to be squeezed out of the shrinkage pipe by a distance, thus completely blocking the shrinkage end and preventing moisture in the rock mass from entering the outer sleeve to cause corrosion.

In this embodiment, the blocking effect of the rubber plug can prevent water in the drilled hole from entering the outer sleeve to cause corrosion, and the bearing ratio of the surrounding rock at different positions can be adjusted according to the thickness of the thick section of the rubber plug.

In this embodiment, the strength of the inner sleeve is less than the strength of the shrinkage pipe; the shrinkage pipe includes a necked section and an equal-diameter section that are sequentially connected from outside to inside; the outer diameter of the necked section remains unchanged, the inner diameter of the necked section gradually shrinks, and the outer diameter and inner diameter of the equal-diameter section remain unchanged.

In this embodiment, the outer diameter of the inner sleeve is matched with the inner diameter of the outer sleeve, the anchor is in contact with the outer end of the inner sleeve, a necked lead angle section is arranged on the periphery of the inner end of the inner sleeve, and after the anchor cable is stressed, the anchor squeezes the inner sleeve, and after the necked lead angle section makes contact with the necked section, the plastic deformation of the inner sleeve is facilitated to prevent jamming.

In this embodiment, the rubber plug includes a thin section and a thick section that are sequentially connected, a small hole is provided in the middle of the rubber plug for the steel strand to pass through, the thin section is inserted into an inner hole of the shrinkage pipe or an inner hole of the outer sleeve, and the outer diameter of the thick section is equal to the outer diameter of the outer sleeve.

In this embodiment, by reducing the thickness of the thick section of the rubber plug, the contact stiffness between the bottom end of the outer sleeve and the rock mass at the bottom end of the enlarged part of the anchor hole can be improved, thereby increasing a contact force F1 between the bottom end of the outer sleeve and the rock mass at the bottom end of the enlarged part of the anchor hole, and further reducing a tensile force F2 borne by the nut and the tray, and preventing the nut from being damaged, wherein the sum of F1 and F2 is the total bearing force of the anchor cable, and is also equal to the tensile force borne by the anchoring agent; and by increasing the thickness of the thick section of the rubber plug, the contact stiffness between the bottom end of the outer sleeve and the rock mass at the bottom end of the enlarged part of the anchor hole can be reduced, thereby reducing the contact force between the bottom end of the outer sleeve and the rock mass at the bottom end of the enlarged part of the anchor hole, preventing the rock mass at the bottom end of the enlarged part of the anchor hole from being damaged, and making the nut fully play its own role.

In this embodiment, before tightening the nut in step 6, a certain prestress is applied, and this part of prestress directly acts on the rock mass at the bottom end of the enlarged part of the anchor hole, thereby increasing the bearing ratio of the contact force F1 between the bottom end of the outer sleeve and the rock mass at the bottom end of the enlarged part of the anchor hole.

In this embodiment, a strain or stress sensor is embedded in the thick section of the rubber plug, and the sensor measures the force F1 borne by the rock mass at the bottom end of the enlarged part of the anchor hole, and then the subsequent thickness of the thick section of the rubber plug of the anchor cable is adjusted, so that the magnitude of F1 is between 20% and 50% of the ultimate bearing force of the anchor cable.

In this embodiment, the outer sleeve is a thick-walled steel pipe, the shrinkage pipe is a high-strength steel pipe, and the inner sleeve is a steel pipe.

The working principle of this anchor cable is as follows: when the surrounding rock is deformed, a tensile force is generated on the anchor cable, and the tensile force is transferred to the anchor by means of the steel strand, and the anchor squeezes the inner sleeve. Since the outer sleeve and the shrinkage pipe are fixed, the inner end of the inner sleeve, under high-pressure squeeze, extends into the shrinkage pipe for squeeze, shrinkage and deformation, and is gradually squeezed out of the outer sleeve. This deformation can continue and maintain extremely high resistance, thus achieving the purpose of high-strength deformation. Since the steel strand passes through the outer sleeve and the inner sleeve, and extends out of the outer sleeve, a prestress can be easily applied.

If the present patent discloses or relates to parts or structural members that are fixedly connected to each other, unless otherwise stated, fixed connection may be understood to be detachable fixed connection (e.g., connection by means of a bolt or a screw), or non-detachable fixed connection (such as riveting, welding). Of course, mutual fixed connection may also be replaced by an integrated structure (e.g., integrally formed using a casting process) (except that it is obviously impossible to use an integral forming process).

In the description of the present patent, it should be understood that the orientation or positional relationship indicated by the terms "longitudinal", "transverse", "upper", "lower", "front", "rear", "left", "right", "vertical", "horizontal", "top", "bottom", "inner" and "outer" are based on the orientation or positional relationship as shown in the drawings and are to facilitate the description of the present patent, rather than indicating or implying that the indicated device or element must have a particular orientation or be constructed and operated in a particular orientation, and thus will not be interpreted as limiting the present patent.

The objectives, technical solutions, and advantages of the present disclosure are further described in detail by the preferred embodiments described above. It should be understood that the embodiments described above are merely preferred embodiments of the present disclosure, and are not used to limit the present disclosure. Any modifications, equivalent replacements, improvements etc. that are made within the spirit and principle of the present disclosure shall fall within the scope of protection of the present disclosure.

What is claimed is:

1. A construction method for a deformable anchor cable capable of being prestressed, wherein the anchor cable comprises an outer sleeve, a shrinkage pipe, an inner sleeve, a steel strand, an anchor and a tray; the strength of the inner sleeve is less than the strength of the shrinkage pipe; the shrinkage pipe comprises a necked section and an equal-diameter section that are sequentially connected from outside to inside; the outer diameter of the necked section remains unchanged, the inner diameter of the necked section gradually shrinks, and the outer diameter and inner diameter of the equal-diameter section remain unchanged;

construction comprises the following steps:

step 1, drilling an anchor hole in a rock mass to be supported, withdrawing a drill pipe after the drill pipe reaches the bottom, and then using a big diameter bit to ream and enlarge a hole mouth section, wherein the diameter of the anchor hole is greater than the diameter of the steel strand, and the diameter of the enlarged hole mouth section is matched with the diameter of the outer sleeve;

step 2, pushing the steel strand into the anchor hole rotatably, and fixing an inner end of the steel strand in the anchor hole by means of an anchoring agent;

step 3, fixing the shrinkage pipe to an inner end of the outer sleeve close to the depths of the drilled hole, then mounting a rubber plug on the inner end of the outer sleeve close to the depths of the drilled hole, then placing the outer sleeve into the enlarged section of the anchor hole and enabling the steel strand to pass through the outer sleeve;

step 4, enabling the inner sleeve to sleeve the steel strand, inserting the inner sleeve into the outer sleeve and enabling an inner end of the inner sleeve to make contact with a shrinkage end;

step 5, enabling an outer end of the steel strand to penetrate out of the anchor, and enabling the anchor to be sleeved by the outer sleeve and abut against an outer end of the inner sleeve;

step 6, enabling the tray to sleeve an exposed part of the outer sleeve, enabling an inner end of the tray to abut against the rock mass and an outer end of the tray to abut against a nut that is in threaded fit with an outer end of the outer sleeve, and tightening the nut to lock the tray; and step 7, tensioning the steel strand by a tensioning apparatus to apply a prestress so as to meet design requirements, and applying a sufficient prestress to cause the inner sleeve to be squeezed out of the shrinkage pipe by a distance, thus completely blocking the shrinkage end and preventing moisture in the rock mass from entering the outer sleeve to cause corrosion.

2. The construction method for a deformable anchor cable capable of being prestressed according to claim 1, wherein the outer diameter of the inner sleeve is matched with the inner diameter of the outer sleeve, the anchor is in contact with the outer end of the inner sleeve, a necked lead angle section is arranged on the periphery of the inner end of the inner sleeve, and after the anchor cable is stressed, the anchor squeezes the inner sleeve.

3. The construction method for a deformable anchor cable capable of being prestressed according to claim 1, wherein the rubber plug comprises a thin section and a thick section that are sequentially connected, a small hole is provided in the middle of the rubber plug for the steel strand to pass through, the thin section is inserted into an inner hole of the shrinkage pipe or an inner hole of the outer sleeve, and the outer diameter of the thick section is equal to the outer diameter of the outer sleeve.

4. The construction method for a deformable anchor cable capable of being prestressed according to claim 3, wherein by reducing the thickness of the thick section of the rubber plug, the contact stiffness between the bottom end of the outer sleeve and the rock mass at the bottom end of the enlarged part of the anchor hole can be improved, thereby increasing a contact force F1 between the bottom end of the outer sleeve and the rock mass at the bottom end of the enlarged part of the anchor hole, and further reducing a tensile force F2 borne by the nut and the tray, and preventing the nut from being damaged, wherein the sum of F1 and F2 is the total bearing force of the anchor cable, and is also equal to the tensile force borne by the anchoring agent; and by increasing the thickness of the thick section of the rubber plug, the contact stiffness between the bottom end of the outer sleeve and the rock mass at the bottom end of the enlarged part of the anchor hole can be reduced, thereby reducing the contact force between the bottom end of the outer sleeve and the rock mass at the bottom end of the enlarged part of the anchor hole, preventing the rock mass at the bottom end of the enlarged part of the anchor hole from being damaged, and making the nut fully play own role.

5. The construction method for a deformable anchor cable capable of being prestressed according to claim 4, wherein before tightening the nut in step 6, a certain prestress is applied, and this part of prestress directly acts on the rock mass at the bottom end of the enlarged part of the anchor hole, thereby increasing the bearing ratio of the contact force F1 between the bottom end of the outer sleeve and the rock mass at the bottom end of the enlarged part of the anchor hole.

6. The construction method for a deformable anchor cable capable of being prestressed according to claim 4, wherein a strain or stress sensor is embedded in the thick section of the rubber plug, and the sensor measures the force F1 borne by the rock mass at the bottom end of the enlarged part of the anchor hole, and then the subsequent thickness of the thick section of the rubber plug of the anchor cable is adjusted, so that the magnitude of F1 is between 20% and 50% of the ultimate bearing force of the anchor cable.

7. The construction method for a deformable anchor cable capable of being prestressed according to claim 1, wherein the outer sleeve, the shrinkage pipe, and the inner sleeve are steel pipes.

* * * * *